No. 742,967. PATENTED NOV. 3, 1903.
F. W. CALDWELL.
COMBINED MOTOR CONTROLLER AND ENGINEER'S VALVE.
APPLICATION FILED MAY 28, 1903.
NO MODEL.

Witnesses
J. Ellis Glenn.
Helen Orford

Inventor.
Frederick W. Caldwell.
by Albert G. Davis
Atty.

No. 742,967. Patented November 3, 1903.

UNITED STATES PATENT OFFICE.

FREDERICK W. CALDWELL, OF SCHENECTADY, NEW YORK, ASSIGNOR TO GENERAL ELECTRIC COMPANY, A CORPORATION OF NEW YORK.

COMBINED MOTOR-CONTROLLER AND ENGINEER'S VALVE.

SPECIFICATION forming part of Letters Patent No. 742,967, dated November 3, 1903.

Application filed May 28, 1903. Serial No. 159,116. (No model.)

*To all whom it may concern:*

Be it known that I, FREDERICK W. CALDWELL, a citizen of the United States, residing at Schenectady, in the county of Schenectady and State of New York, have invented certain new and useful Improvements in a Combined Motor-Controller and Engineer's Valve, of which the following is a specification.

My present invention relates to means for controlling the motors and air-brakes on electrically-propelled vehicles.

In the operation of electrically-propelled cars or vehicles, either individually or when coupled together to form a train, it has been customary to control the motors by means of a motor-controller which is entirely separate and distinct from the means for controlling the application of the brakes. In modern electric-railway practice the old-style handbrake has been supplemented by and in some cases superseded by air-brakes which are controlled from an ordinary form of engineer's valve located adjacent to the motor-controller. The motor-controller and air-brake are controlled separately and independently by different handles, which require substantially the entire attention of the motorman or operator.

The object of my invention is to simplify the control of the motors and air-brakes on electrically-propelled vehicles and allow the motorman greater freedom.

My invention consists, broadly, in the combination of a motor-controlling switch and an air-brake engineer's valve, together with means for so connecting said controller and valve that they may be operated from a single handle.

More specifically considered my invention consists of the combination of a motor-controller and an air-brake engineer's valve, together with a clutch so constructed and arranged that it will cause the controller-cylinder to move through its operative positions as the controller-handle is moved forward from its "off" position and will cause the engineer's valve to be moved through its operative positions to cause the air-brakes to be applied when the controller-handle is moved in a reverse direction from the off position.

Figure 1:
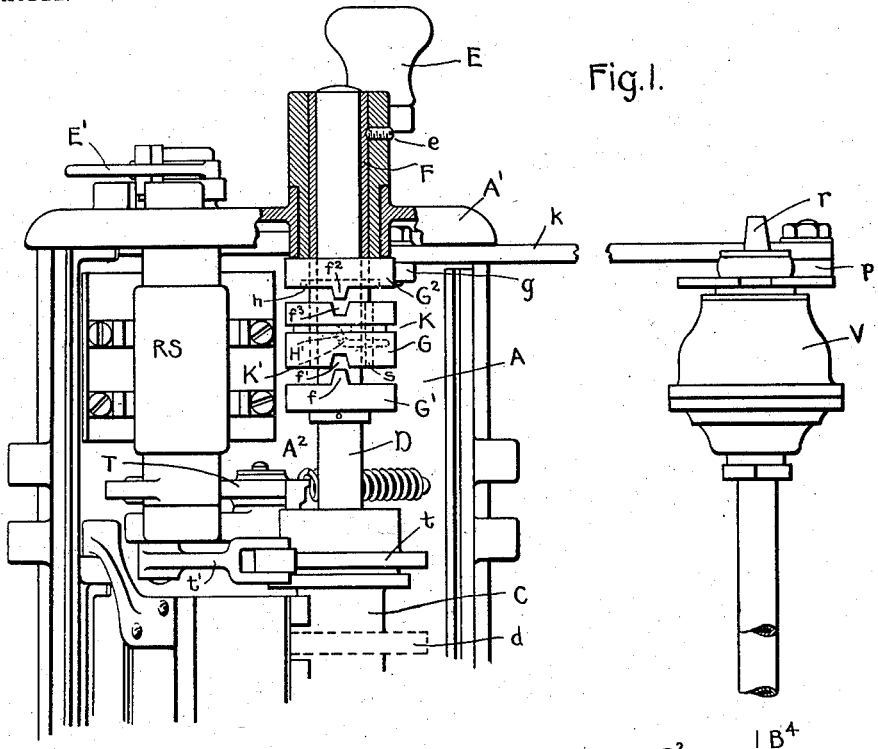
Figure 2:
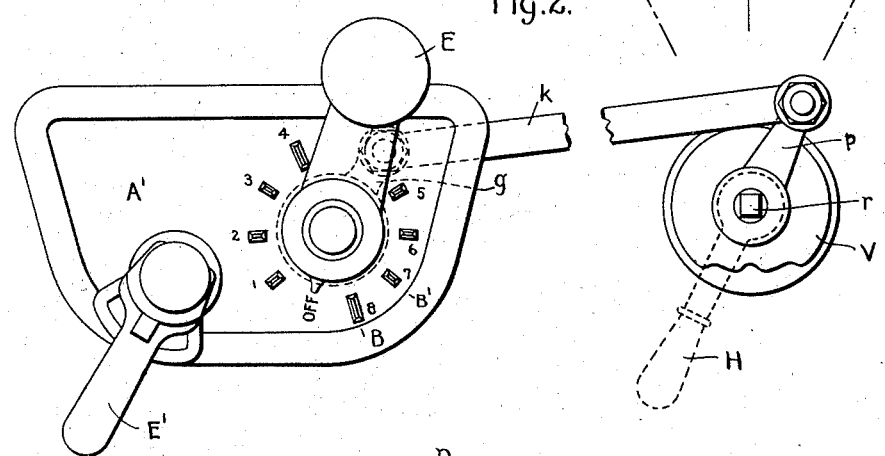
Figure 3:
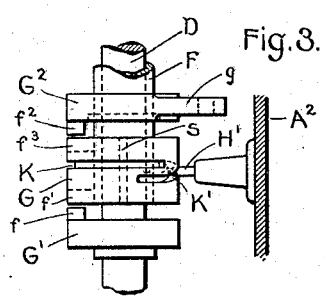

Referring to the accompanying drawings, which illustrate the preferred embodiment of my invention, Figure 1 is a front elevation, partly in section, of a motor-controller and an engineer's valve, showing the connections between said controller and engineer's valve and the clutch for operating the same. Fig. 2 is a plan view of the controller and engineer's valve shown in Fig. 1, and Fig. 3 is a side elevation of the clutch and clutch-operating means.

Referring now to Fig. 1, A indicates a motor-controller casing, and V indicates the customary form of engineer's valve used to control the application of the brakes in a "straight" air-brake system. It will of course be understood that the invention is equally applicable to the "automatic" air-brake system and that the type of engineer's valve used is immaterial. The controller-cylinder, which is indicated by C, carries the customary contact-segments $d$ and is mounted on the shaft D, which extends upward through the cap-plate A' of the controller-casing. Rotatably mounted on said controller-shaft and fastened to the operating-handle E by means of the set-screw $e$ is a sleeve F, upon the lower end of which is splined at $s$ a clutch member G. This clutch member G is adapted to be moved longitudinally on the sleeve F into engagement with the clutch members G' and $G^2$ and is prevented from rotating about said sleeve. Mounted upon the back $A^2$ of the controller-casing is a pin or projection H', which engages with the cylindrical cam-groove K in such a manner that as the operating-handle is moved forward or backward from the off position of the controller the pin H' follows the inclined portion K' of said groove K (more clearly shown in Fig. 3) and reciprocates the clutch member G. The clutch member $G^2$, which is rotatably mounted on the sleeve F, is provided with a projection or arm $g$, to which is pivoted one end of the link $k$, the other end of said link being pivoted to the arm $p$, carried by the spindle $r$ of the engineer's valve V. If so desired, gears may be used in place of the link connection just referred to. The clutch member $G^2$ is held in place on the sleeve F by means of the collar $h$, which is fixed to said sleeve. The clutch member $G'$ is rigidly fastened to the controller-shaft D.

The connections between the engineer's valve and the operating-handle of the controller are so arranged that, if desired, they may be readily removed and the handle H (shown in dotted lines in Fig. 2) may be applied to the valve-spindle $r$ and the engineer's valve operated thereby independently of the motor-controller. It will be understood that with the engineer's valve in the position shown in Figs. 1 and 2 the air-brakes are released—that is to say, the engineer's valve is in its "release" or "running" position. When the controller-handle is moved from its off position backward into the position indicated by $B'$, the engineer's valve is moved from its release position (indicated by $B^3$) into its "emergency-application" position (indicated by $B^2$) and the air-brakes are applied. The customary "lap" position of the engineer's valve is indicated by $B^4$, and the position of the controller-handle corresponding to said lap position is indicated by B. The rapidity with which the air-brakes are applied is regulated by the movement of the engineer's valve between the lap position and the emergency-application position.

Referring again to Fig. 1, RS represents the customary reversing-switch used in master-controllers. Said reversing-switch is operated by the handle $E'$, and the customary interlock between said reversing-switch and the controller-cylinder is indicated by T. To indicate to the motorman the operative positions of the controller-cylinder and also to hold said cylinder in its off position while the controller-handle is being moved backward from said off position to apply the air-brakes, I have employed the customary star-wheel $t$ and its coacting lever-arm $t'$.

In the operation of the invention as the controller-handle is moved forward—that is to say, in a right-handed or clockwise direction—the sleeve carrying the clutch member G is rotated and said clutch member is moved into engagement with the clutch member $G'$ in such a manner that the projection $f$, carried by said clutch member $G'$, engages with the recess $f'$, formed in the clutch member G. A further forward movement of the controller-handle causes the controller-cylinder C to be moved through its operative positions, (indicated in Fig. 2 by 1 to 8, inclusive.) It will be seen that during this forward movement of the controller-handle the air-brake valve remains stationary. As the controller-handle is moved backward—that is to say, in a left-handed or counter-clockwise direction from the off position—the clutch member G is constrained to move longitudinally on the sleeve F by the action of the pin $H'$ in the cam-groove. The projection $f^2$, carried by the clutch member $G^2$, is thus brought into engagement with the recess $f^3$ in the clutch member G, and as the backward movement of the controller-handle is continued the clutch member $G^2$ is rotated with the sleeve F and causes the engineer's valve to be moved toward the position indicated by $B^2$ to apply the air-brakes.

Although I have shown and described herein specific means for carrying out my invention, I do not wish to be limited thereto, since many modifications can be made by persons skilled in the art to which this invention relates without departing from its spirit or scope.

What I claim as new, and desire to secure by Letters Patent of the United States, is—

1. In combination, a motor-controller, an air-brake engineer's valve, and means operated by the movements of the controller-handle for causing said controller and said engineer's valve to be moved through their operative positions.

2. In combination, a motor-controller, an engineer's valve, an operating-handle for said controller and engineer's valve, and means whereby a movement of said operating-handle in one direction from a predetermined position causes a movement of the motor-controller through its operative positions and a movement of said handle in the opposite direction from said predetermined position causes a movement of the engineer's valve through its operative positions.

3. In combination, a controlling-switch, an engineer's valve, an operating-handle for said controlling-switch and said engineer's valve, and a clutch for connecting said handle to said controlling-switch or to said engineer's valve as desired.

4. In combination, a controlling-switch, an engineer's valve, an operating-handle for said controlling-switch and engineer's valve, and a clutch adapted to be moved so as to cause said controlling-switch to be operated when the handle is moved in one direction and to cause said engineer's valve to be operated when the controller-handle is moved in the opposite direction.

In witness whereof I have hereunto set my hand this 27th day of May, 1903.

FREDERICK W. CALDWELL.

Witnesses:
BENJAMIN B. HULL,
HELEN ORFORD.